Dec. 8, 1964    F. G. CONSTANCE ETAL    3,160,164
WASHER WITH REVERSING SPRAY ASSEMBLY
Filed Oct. 3, 1963    8 Sheets-Sheet 1

FIG. 1

INVENTORS.
FREDERICK G. CONSTANCE &
RICHARD L. PERL
BY
Oberlin, Mahy & Donnelly
ATTORNEYS Dec. 8, 1964     F. G. CONSTANCE ETAL     3,160,164
WASHER WITH REVERSING SPRAY ASSEMBLY
Filed Oct. 3, 1963     8 Sheets-Sheet 5

INVENTORS.
FREDERICK G. CONSTANCE &
RICHARD L. PERL
BY
*Oberlin, Mahry & Donnelly*
ATTORNEYS

INVENTORS.
FREDERICK G. CONSTANCE
& RICHARD L. PERL

United States Patent Office 3,160,164
Patented Dec. 8, 1964

3,160,164
WASHER WITH REVERSING SPRAY ASSEMBLY
Frederick G. Constance and Richard L. Perl, Mansfield, Ohio, assignors to The Tappan Company, Mansfield, Ohio, a corporation of Ohio
Filed Oct. 3, 1963, Ser. No. 313,534
22 Claims. (Cl. 134—176)

This invention relates in general to washing machines and devices, such as dishwashers, in which a reversing spray of water or cleaning solution is desired for varying distribution of the spray, and relates more particularly to improved spray mechanism in which such a reversal is automatically effected in the normal operating cycle thereof.

In washers, for example dishwashers, provided with directional spray arms of the so-called reaction type, fluid under pressure enters the interior of the spray arm and flows outwardly thereof through drive jets or openings which are inclined relaitve to the vertical, the pressure of the fluid directed outwardly through the jets creating a reaction force causing rotation of the arm in a direction opposite to that of the jet spray. In washers of the described type a spray pattern is created which, stated in a somewhat oversimplified way, comprises generally vertical and horizontal spray components producing an inclined directional spray. Such a spray pattern often results in less than satisfactory washing since the dishes or other tableware in the washing chamber are thus subjected to the spray substantially only at one side in any sense of direct scouring impingement.

A primary object of the present invention, therefore, is to achieve a new and superior liquid spraying action by providing a spray arm the direction of rotation of which is reversed automatically to create varying spray patterns and thereby achieve greater distribution of the liquid as projected by said arm.

A further object of the invention is to provide such a dishwashing machine having such a spray arm therein so that the noted reversing action provides washing and rinsing of all surfaces of the dishes and utensils to be cleansed in the machine.

A further object of the present invention is to provide a reversing spray arm wherein there is a relative radial shifting of the points of origin of the spray responsive to changes in directions of rotation of the spray arm thereby to provide a highly effective spray pattern.

A further object resides in providing such automatic reversal of the new spray arm in response to changes in the fluid pressure of the liquid being discharged through the spray arm.

A further object of the present invention is to provide a highly simplified spray arm construction wherein the means for reversing the rotation of the spray arm responsive to a drop in fluid pressure comprises relatively few component parts thereby substantially reducing problems of malfunction and/or replacement.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
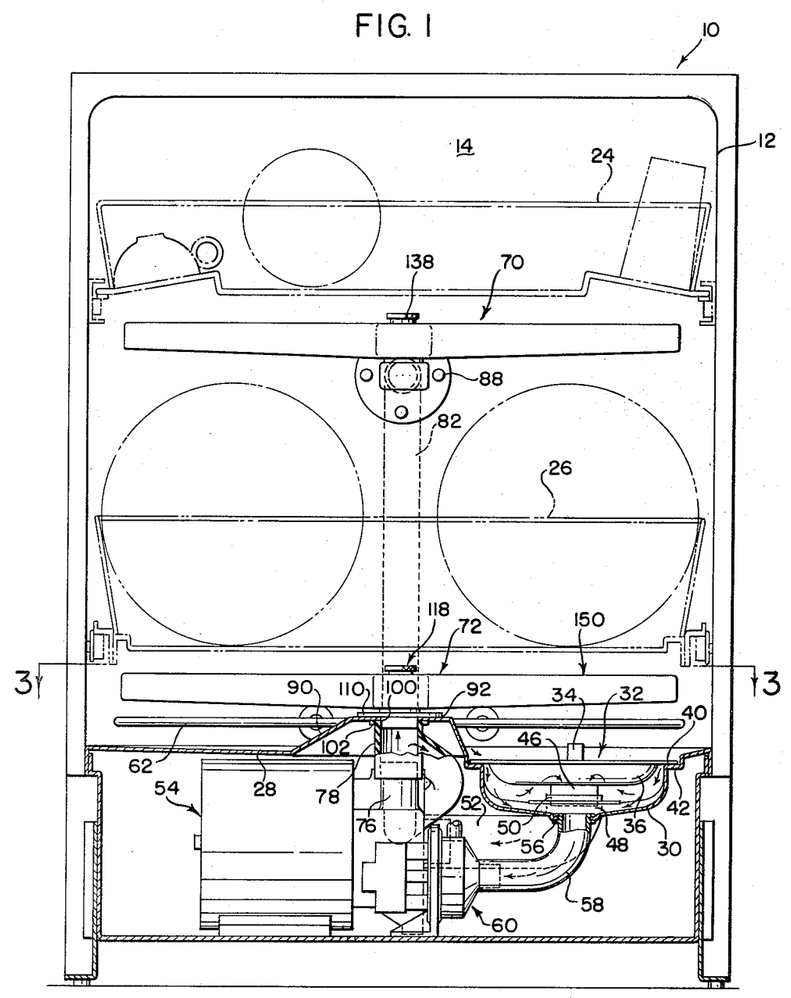
FIG. 1 is a front elevational views, partly broken away and sectioned, of a dishwasher having a pair of vertically spaced spray arm assemblies constructed in accordance with the present invention.
Figure 2:
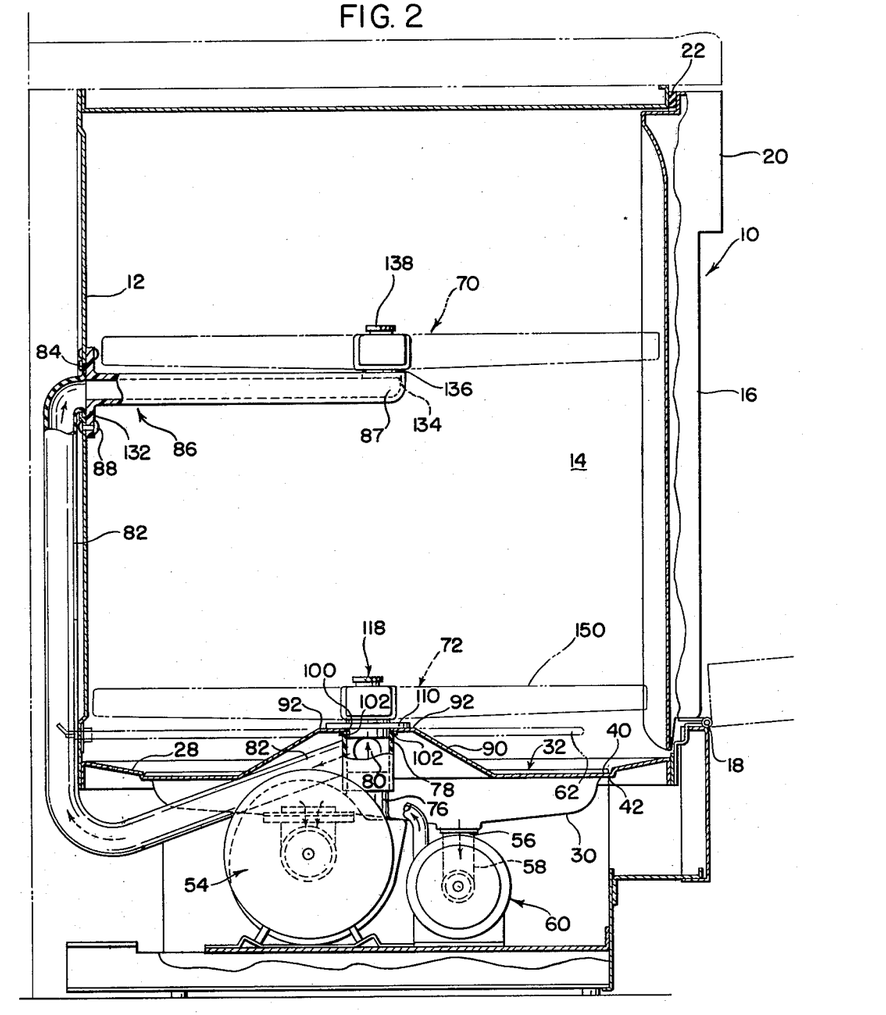
FIG. 2 is a side elevational view, similarly partly broken away and sectioned, of such dishwasher.
Figure 3:
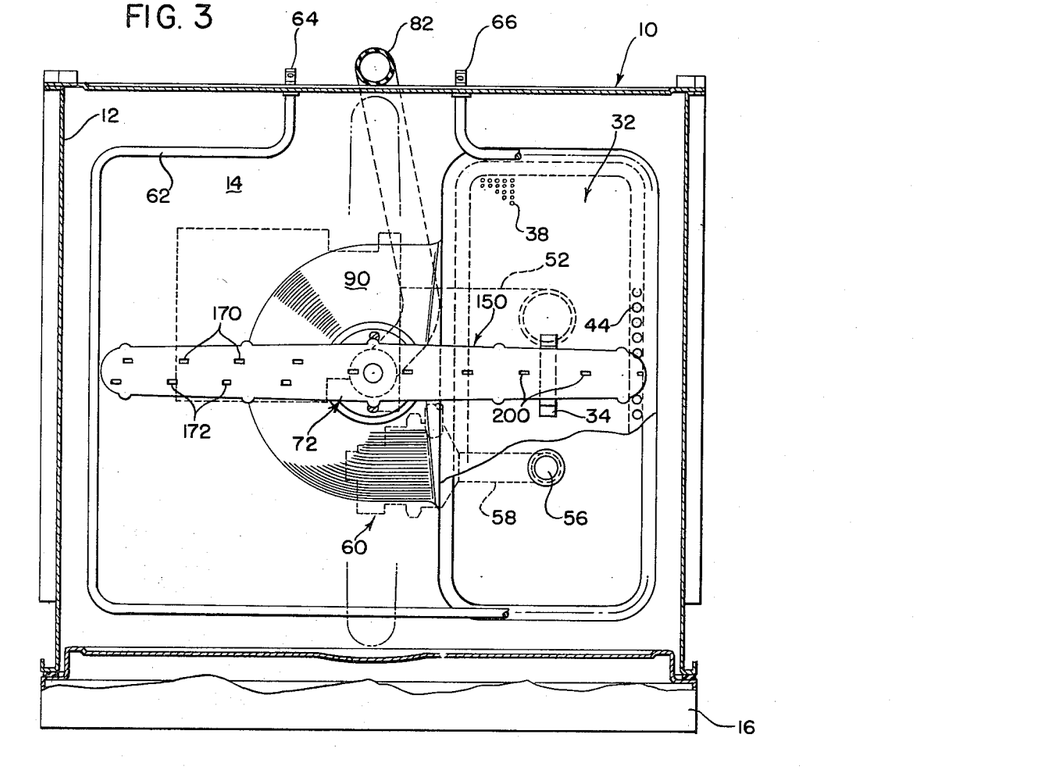
FIG. 3 is a horizontal sectional view taken on section line 3—3 of FIG. 1.

Referring now to the drawings in detail, and initially to FIGS. 1-3, the dishwasher embodying the present invention comprises a cabinet generally indicated at 10 within which a tub or chest 12 is suitably supported to form a washing chamber 14. The cabinet and tub are both open at the front and are adapted to be closed by a bottom hinged door 16 which is pivotally mounted at the front of the cabinet as indicated at 18 for movement between a vertical, closed position and a substantially horizontal, open position, the latter such position being shown in dotted lines in FIG. 2 providing access to the interior of the tub 12. The door 16 includes a hand grip portion preferably at the top thereof for opening and closing the door in the usual manner. Suitable sealing strips, the top sealing strip being shown at 22, are provided at the sides for sealing the door when closed.

Upper and lower racks 24 and 26, respectively, shown in dashed lines in FIG. 1, are disposed within the tub 12 for holding tableware, utensils, and the like, also indicated in dashed lines in FIG. 1. In the usual manner, which forms no part of the present invention, the racks 24 and 26 are provided with guide rollers or the like at the sides thereof for rolling engagement with supporting and guiding structure mounted on the sides of the tub whereby the racks can be rolled from the tub for convenient loading and unloading. As will be hereinafter more specifically described, the upper rack 24 is disposed above the top spray arm assembly and the lower rack 26 is disposed between the top and bottom spray arm assemblies.

The tub 12 is provided with a sloped bottom 28 the lowest portion of which is in the form of a depressed sump 30 having an open top adapted to be covered by a filter element generally indicated at 32. Referring jointly to FIGS. 1 and 3, the filter element 32 is provided with a handle 34 for removing the same for cleaning thereof, and further includes a dish-shaped body portion 36 of relatively fine filter screen material having apertures 38 provided therein which trap the food particles and allow recirculation of only generally particle-free solution. The filter 32 further includes a peripheral flange 40 adapted to seat on a complemental peripheral flange member 42 formed in the top of the sump 30. The solution drains from the tub through a plurality of spaced holes 44 which extend around the top of the filter element inwardly of the flange 42 whereby the solution drains into the sump 30 as indicated by the arrows in FIG. 1. The solution passing upwardly through the relatively fine openings 38 drains from the filter 32 through a recirculating drain pipe 46 suitably secured to and depending from the bottom of such filter element. The drain pipe 46 is adapted to telescope within a pipe-receiving upper end 50 of a hose member 52 which leads to the input side of a circulating pump generally indicated at 54. The sump further includes a drain outlet 56 through which the particles not passing through the filter element are adapted to be drained. A drain hose 58 is suitably connected to the drain opening 56, the opposite end of such hose communicating with the inlet of a drain pump generally indicated at 60, the latter pumping the drained solution to a suitable discharge point in a well-known manner.

A water fill hose (not shown) is provided for supplying water to the washing chamber 14, the usual air gap being provided between the hose and the water-receiving means on the machine. Such water fill hose can be mounted adjacent the tub 14 in any suitable location, for example relatively adjacent the top wall thereof for water flow over the dishes and utensils during the pre-wash cycle.

An electric heating element 62 irregularly shaped as shown is mounted adjacent the bottom of the tub, the terminal ends 64 and 66 of the heating element 62 extending from the cabinet rear wall and being connected to a suitable current source whereby such heating element is adapted to heat the water or solution in the region thereabout.

It will thus be seen that in the invention thus far described water supplied to the washing chamber 14 will drain toward the sump 30 and the portion thereof sufficiently free from entrained solids will pass through the apertures 38 into the recirculating drain pipe 46 and thus to the hose 52 leading to the circulating pump 54. If there is no pre-wash cycle, the entire supply of water will of course pass to the pump 54. Responsive to control apparatus provided with the dishwasher and forming no part of the present invention, the circulating pump 54 will circulate water to the upper and lower spray arms briefly referred to above and generally indicated at 70 and 72, respectively, the construction and operation of which will be hereinafter specifically described. The water emanating from the spray arms 70 and 72 will thoroughly wash the tableware and utensils in the washing chamber 14, such solution ultimately gravitating to the bottom of the tub and to the sump 30. As previously described, food particles of a size in excess of the size of the openings 38 will pass through the sump drain 56 to the drain pump 60 for ultimate discharge.

The discharge outlet 76 of the circulating pump 54 has connected thereto a center hose 78 axially through which water is supplied directly to the lower spray arm 72 as will be hereinafter described. The center hose 78 is provided with an opening 80 in a side wall thereof adapted to receive a hose 82 for supplying fluid to the upper spray arm 70. The opposite end portion of such hose 82 is suitably mounted at its upper end to the back of the tub 12, a peripheral flange 84 being preferably provided at such end of the hose which is clamped between the tub rear wall and the cantilevered tubular mounting member generally indicated at 86 for the upper spray arm 70. As shown in FIG. 2, mounting means indicated at 88 are provided for mounting such member 86 on the rear wall of the tub 12 as will be hereinafter described. It will accordingly be seen that water or solution discharged from the circulating pump 54 will flow upwardly therefrom through the center hose 78 to the lower spray arm 72 and to the upper spray arm 70 through the hose 82.

Figure 5:
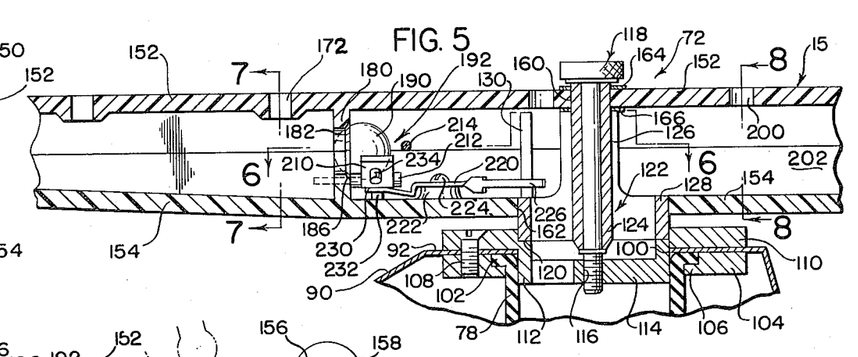
FIG. 5 is a vertical sectional view taken through the spray arm assembly of FIG. 4, on section line 5—5 thereof.

Referring now to the manner in which the lower spray arm 72 is rotatably mounted adjacent the bottom of the tub 12, most clearly shown in FIG. 5, the sloped tub bottom 28 is formed with a central elevated area 90 the top of which is in the form of a horizontally disposed annular mounting flange 92 provided with a central opening 100, the diameter of such opening corresponding with the inside diameter of the center hose 78. The center hose 78 is formed with an outwardly extending top annular flange 102 which abuts the bottom surface of the flange 92. A plate 104 having an inwardly directed flange 106 which underlies the flange 102 abuts the bottom of the flange 92 and is held in this position by means of a plurality of bolts 108, only one of which is shown in FIG. 5, which extend downwardly through openings formed in center post mounting member 110. The mounting member 110 is provided with a central cylindrical portion 112 which telescopes within the center hose 78 and further includes a plurality of arcuately spaced spider elements 114, only one of which is visible in FIG. 5, which centrally define a threaded opening 116 adapted to receive a spray arm mounting knob generally indicated at 118, as will be hereinafter further described. The combined horizontal cross-sectional area of the elements 114 does not materially affect fluid flow upwardly therethrough.

The mounting member 110 is formed with an annular groove 120 for seating engagement with a center post generally indicated at 122. The center post includes a cylindrical central portion 124 through which the mounting knob 118 extends, a plurality of spider arms 126 rigidly connected thereto, and an outer cylindrical ring portion 128 preferably integrally formed with the spiders 126, the bottom of such ring portion seating in the above-described groove 120 in the mounting member 110. The center post is maintained in such assembled position by means of the mounting knob 118.

An actuating pin 130 is rigidly mounted to the center post 122 adjacent the periphery thereof and extends upwardly therefrom to a height approximating the height of the spiders 126. In a manner to be more specifically described hereinbelow, the actuating pin 130 functions to condition the spray arm assembly for automatic reversal in direction of rotation.

It will thus be seen that the center hose 78, the center post mounting member 110 and the center post 122 form a rigidly connected assembly through which water directed upwardly through the center hose 78 can be effectively supplied to the spray arm assembly 72.

The upper spray arm 70 is mounted on the inner end 87 of the tubular mounting member 86 in much the same manner as the mounting for the lower spray arm 72. The inner end 87 thereof thus receives the center post (not shown), which in turn rotatably mounts the spray arm 70, the latter being retained thereon by means of mounting knob 134.

The upper and lower spray arm assemblies 70 and 72, respectively, are identically constructed and accordingly only one need be described in detail. As best shown in FIGS. 4-10, the lower spray arm 72 comprises a housing generally indicated at 150 which is in the form shown preferably plastic and comprises upper and lower mating housing sections 152 and 154, respectively. Each of said upper and lower sections is formed with a plurality of peripherally spaced embossed portions commonly designated at 156 through which suitable securing means, for example bolt means, commonly designated at 158, are adapted to extend into threaded engagement with tapped openings in the lower section 154 for assembly of the section in the manner indicated to provide a tubular housing.

The upper housing section 152 is formed with a central opening 160 which, then the mounting bolt 118 is removed from threaded engagement with the mounting member 110, is adapted to fit over the cylindrical central portion 124 of the center post, the top surface of the spiders 126 serving to support the upper section in such position. The bottom section 154 is similarly provided with a centrally disposed opening 162 for positioning such lower section around the ring portion 128 of the center post. The housing 150 is thus supported for rotation at the top and bottom thereof. A pair of bearing washers 164 and 166 are provided on either side of the upper section 152 around the central opening therein.

Figure 4:
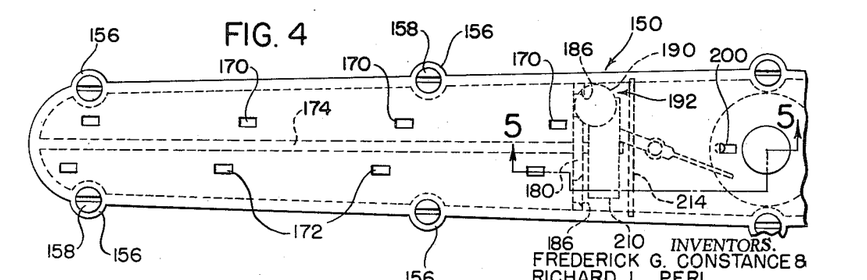
FIG. 4 is an enlarged fragmentary plan view of one form of spray arm assembly of the invention.
Figure 6:
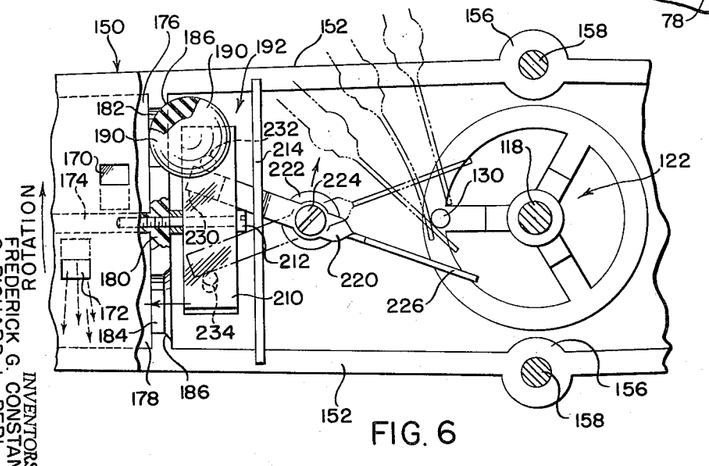
FIG. 6 is a sectional view taken on line 6—6 of FIG. 5, on an enlarged scale.
Figure 7:
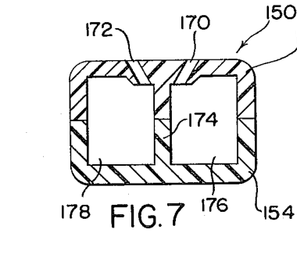
FIG. 7 is a sectional view taken on line 7—7 of FIG. 5.
Figure 8:
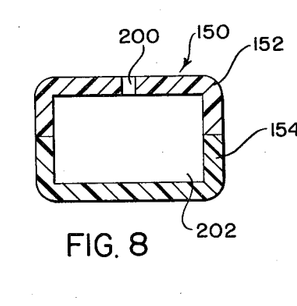
FIG. 8 is a sectional view taken on line 8—8 of FIG. 5.

One end of the housing 150, the left end as viewed in FIGS. 4-6, is provided with a series of radially spaced drive jets or openings, one row of which is commonly designated at 170, disposed on one side of a vertical plane passing through the longitudinal axis of the spray arm. These drive jets 170 are directed outwardly and upwardly relative to the housing, as clearly shown in FIG. 7. A series of radially staggered, oppositely directed spray jets or openings commonly designated at 172 are provided on the opposite side of such plane passing through the longitudinal axis, the openings 172 likewise being directed upwardly and outwardly relative to the housing. In a manner well understood to those in the art, the provision of such drive jets provides a reaction type spray arm rotation wherein water directed to the housing and outwardly through either of the set of the jets 170 or 172 will serve to drive the spray arm in a direction opposite to the horizontal component of the inclined jets. This directional relationship is clearly shown in FIG. 6 wherein the fluid is shown emanating through the drive jets 172 and wherein the spray arm 150 is shown as rotating in the opposite, clockwise rotation.

That end of the spray arm housing 150 formed with the drive jets 170 and 172 is provided with a longitudinally extending partition 174 for separating the housing into two chambers 176 and 178, the former chamber communicating with the washing chamber 14 through the drive jets 170 and the latter chamber communicating with the washing chamber through the drive jets 172. As will be apparent, fluid is alternately supplied to either chamber 176 or chamber 178 for driving the spray arm in opposite directions.

A transversely extending partition 180 defines the inner bounds of the chambers 176 and 178, such partition being provided with spaced ports 182 and 184 for alternately supplying fluid to the chambers 176 and 178, respectively. The ports 182 and 184 are preferably provided with beveled surfaces commonly designated at 186 to enhance the seating of a ball valve 190 of a ball valve assembly or mechanism generally indicated at 192. The ball 190 alternately seats on the beveled surfaces 186 of the ports 182 and 184 to alternately close the respective chambers 176 and 178 to liquid flow through these ports, as will be further described hereinbelow.

The opposite end of the spray arm housing 150 is in the form shown provided with a series of spaced, vertically disposed non-drive jets or openings 200. As clearly seen in FIG. 8, the inner end of the housing containing the non-drive jets 200 is completely open thus comprising but a single fluid chamber 202. Although in the form shown, drive jets are provided on only one side of the spray arm, it should be understood that drive jets could be provided on both sides of the spray arm as well.

Figure 9:
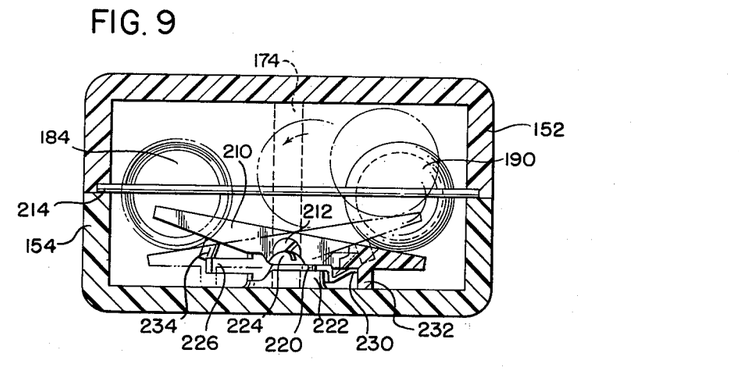
FIG. 9 is a partially sectioned view of the fluid flow control mechanism of the spray arm assembly illustrated in FIGS. 4-8.

Referring now to the detailed construction of the ball valve assembly 192, a bar member 210 is pivotally mounted on the transverse partition 180 by means of a mounting screw 212, the latter extending through the partition 180 into a threaded opening in the longitudinal partition member 174. The bar 210 serves as a ramp down which the ball 190 can move to positions adjacent ports 182 or 184 under conditions to be described hereinbelow. To prevent the ball 190 from sliding off the side of the bar 210, a guide rail 214 is provided, the opposite ends of which are firmly secured in the sides of the housing section 152, as shown in FIG. 9.

A bar actuating member 220 is pivotally mounted on an embossed section 222 of the bottom of the housing section 154 by means of screw 224. The bar actuator 220 includes a preferably vertically oriented flexible inner end 226 which, during rotation of the spray arm, contacts the actuating pin 130 of the center post. The opposite end of the bar actuating member 220 is bent downwardly as indicated at 228 and terminates in an upwardly inclined resilient end portion 230 which engages the bottom of the bar 210 and continually biases the same upwardly about mounting screw 212. Thus, in the FIGS. 9 and 10 position of the valve assembly, the end 230 biases the bar 210 about the screw 212, the bar 210 being refrained from so pivoting, however, by the water pressure acting against the ball 190 and seating the same to close the port 182, as will be further described hereinbelow. The bottom of the bar 210 is provided with pins 232 and 234 which serve to limit the pivotal movement in either direction of the bar actuating member 220.

Figure 10:
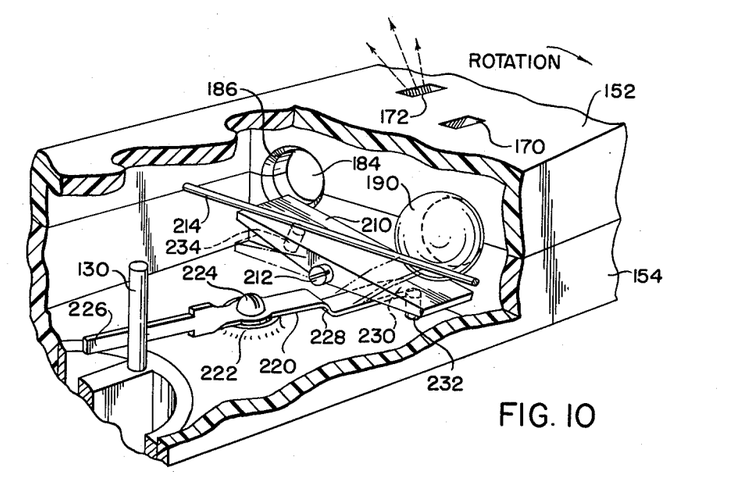
FIG. 10 is a fragmentary perspective view of such fluid flow control mechanism.

The ball valve assembly functions to reverse the spray arm rotation responsive to a drop in pressure within the housing 150. Such a drop in pressure occurs with each cycle change, as controlled by the timed controls provided with the dishwasher as previously described and which form no part of the present invention. To provide a specific example, presume that the FIG. 10 showing of the valve assembly represents the positioning of the various members during a washing cycle. The fluid circulated by the circulating pump 54 flows upwardly through the center hose 78 to the spray arms 70 and 72, the fluid flowing to the latter through the center post and mounting structure therefor and into the housing 150. A portion of the fluid flow directed to the housing 150 will flow to the chamber 202 and outwardly therefrom through the vertically disposed non-drive jets 200. The remainder of the fluid is directed toward that end of the housing 150 having the drive jets 170 and 172, and as the fluid under pressure enters such housing end, the ball 190 is forced by such fluid to seat against and thus close the port 182. As the fluid pressure seats the ball 190 against the beveled surface 186 of the port 182 thereby closing the latter, the fluid will be directed through the opposite port 184 and thence outwardly through the drive jets 172 whereby the spray arm will rotate in a clockwise direction, referring to the FIGS. 6 and 10 orientation thereof. As the spray arm rotates in a clockwise direction about the vertical axis thereof, the inner flexible end 226 of the bar actuating member 220 will contact the stationary actuating pin 130 during each revolution. Thus, following the first revolution and thereafter, the bar actuator 220 will be biased by the actuating pin 130 to a position wherein the opposite end 230 thereof will underlie the bar 210 in a region thereof below the port 182 and the ball valve 190 seated thereagainst. As previously described, this opposite end 230 biases the bar 210 upwardly about mounting screw 212, or counterclockwise as viewed in FIGS. 9 and 10. The force exerted by the end 230 of the bar actuator 220 is, however, less than the force of the fluid pressure within the housing acting on the ball 190 and seating the same to close the port 182. Thus, while this fluid pressure is maintained, the bar actuator 220 will not exert a force sufficient to unseat the ball 190.

As soon as the fluid pressure within the housing drops off, for example at the end of such washing cycle, the force of the bar actuator 220, and more particularly the end 230 thereof which engages and biases upwardly the bottom of the bar 210, will, at a certain point, exceed the pressure of the fluid within the housing, at which time the end 230 of the bar actuator 220 will cause the bar 210 to pivot about the mounting screw 212 thereby unseating the ball valve 190 from the beveled valve seat 186 of the port 182. The ball 190 will then roll down the bar 210, as shown by dashed lines in FIG. 9, to a position approximately below the port 184. The bar actuator 220 will remain in its FIG. 10 position until the spray arm is rotated in the opposite direction.

At the commencement of another washing or rinsing cycle, fluid is again supplied to the housing 150 in the above-described manner and such fluid under pressure will effect a seating of the ball valve 190 against the beveled valve seat 186 of the port 184 whereby the fluid entering that portion of the housing 150 containing the valve assembly will be directed through the port 182 into the chamber 176. Such pressurized fluid will be directed outwardly through the drive jets 170 thereby rotating the spray arm in the opposite direction, or in a counterclockwise direction as viewed in FIGS. 6 and 10. Subsequent to the first revolution, the inner end 226 of the bar actuator 220 will contact the stationary actuating pin 130 during each revolution of the spray arm and such contact will cause the bar actuator 220 to pivot about the pivot 224 to a position underlying the opposite end of the bar 210 and approximately beneath the closed port 184, such pivotal movement being limited by the limit pin 234. As previously described, the force of the resilient end portion 230 of the actuator 220 is ineffective to unseat the ball 190 until a subsequent drop in fluid pressure in the housing. The bar actuator 220 will be maintained in this position as long as the spray arm continues to rotate in a counterclockwise direction, reference again being made to the FIGS. 6 and 10 orientation thereof. As soon as the pressure within the housing 150 becomes less than the force of the end 230 of the actuator bar 220 acting upwardly against the bottom of the bar 210, the ball valve 190 will be unseated and the bar 210 will be pivoted about mounting screw 212 to its FIGS. 9–10 position, at which time the ball 190 will roll down the bar to a position below the port 182.

In this manner the direction of rotation of the spray arm can be reversed in a very simple manner and through purely mechanical means, such reversal being responsive to a decrease in fluid pressure within the spray arm. Moreover, the reversal is effected automatically by the rotation of the spray arm, the biasing of the valve during such rotation being ineffective until a decrease in fluid pressure within the spray arm at the end of the cycle. There will thus be a reversing of the spray arm at the end of each cycle, there normally being a plurality of such cycles in each cleansing operation. In this manner the tableware and utensils will be thoroughly washed on both sides thereof by the drive jets 170 and 172, such cleansing action being supplemented by the non-drive jets 200 which function to continually direct fluid upwardly into the washing chamber 14. It should further be noted that by radially staggering the drive jets 170 and 172, a relative shifting of the points of origin of the spray is effected whereby the spray is radially varied during each direction of rotation. This arrangement results in a much improved spray patttern not obtainable in conventional, directional type spray arms.

Although the above discussion was directed to the construction and operation of the lower spray arm 72, it will be understood that, as previously described, the internal construction and the operation of the upper spray arm 70 is the same as that described for the lower spray arm 72, whereby a further description is not needed. It will be apparent, moreover, that the upper spray arm 70 can be made to rotate in the same direction as the lower spray arm 72, or in the opposite direction thereof.

Figures 11, 12, 15:
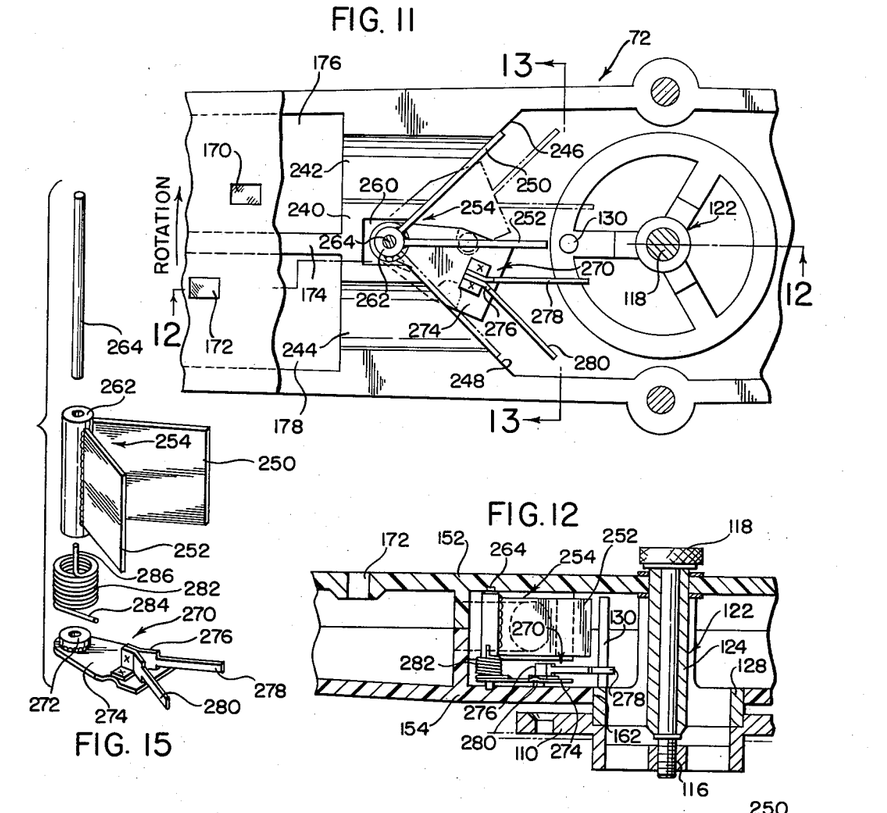
FIG. 11 is a fragmentary top plan view, partially sectioned, of an alternative form of spray arm assembly.
FIG. 12 is a sectional view of such alternative form spray arm assembly, taken on lines 12—12 of FIG. 11.
FIG. 15 is a perspective, exploded view of the fluid flow control mechanism of the alternative embodiment illustrated in FIGS. 11-14.
Figure 13:
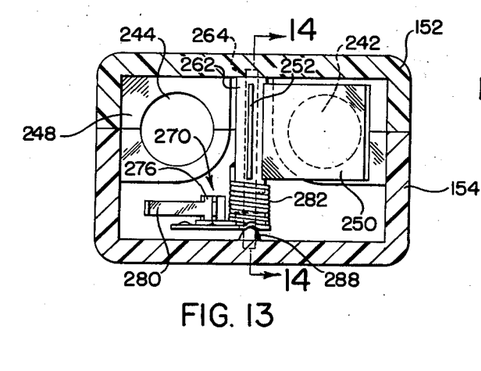
FIG. 13 is a sectional view taken on lines 13—13 of FIG. 11.
Figure 14:
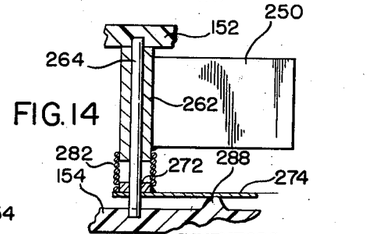
FIG. 14 is a sectional view taken on lines 14—14 of FIG. 13.

There is illustrated in FIGS. 11–15 a second embodiment of the present invention, such embodiment also comprising a spray arm reversible in direction responsive to a drop in fluid pressure in the housing 150. Where applicable, identical reference characters have been used for structure which has been previously described relative to the first described embodiment. Thus, the center post construction and mounting is identical, and with one exception the construction of the housing 150 is identical to that above described. The housing in the FIGS. 11–15 embodiment, referring to FIG. 11, is provided with a transverse partition 240 having ports 242 and 244 which communicate with the chambers 176 and 178, respectively. The inner end of the partition 240 is formed with oppositely inclined surfaces 246 and 248 against which valve plate members 250 and 252, respectively, are adapted to alternately contact, such valve plate members forming part of a valve assembly generally indicated at 254. Thus, in the FIG. 11 showing, the valve plate 250 is shown in contact with the inclined surface 246 and closing the port 242 whereby the fluid is directed through port 244 to the chamber 178. The valve plates 250 and 252, as will be evident alternatively open and close the ports 242 and 244, respectively.

The transverse partition 240 is provided with a vertical groove 260 within which the valve assembly 254 is rotatably mounted. Referring more specifically to the valve assembly, an exploded view of which is shown in FIG. 15, the plates 250 and 252 are rigidly secured to cylinder 262, the latter being mounted for rotation within the groove 260 by means of a pin 264, the opposite ends of which are loosely received in openings provided therefor in the upper and lower housing sections 152 and 154, as seen in FIG. 12. A valve plate actuating member generally indicated at 270 is also pivotally mounted about the pin 264, the plate actuator being provided with a raised, apertured section 272 through which the pin 264 extends. The plate actuator 270 further includes the flat body portion 274 and a bifurcated pin engaging member 276 mounted in any suitable manner on the body portion 274 and extending upwardly therefrom. The member 276 comprises arms 278 and 280 adapted to be alternately engageable with the actuating pin 130 of the center post 122. A spring member 282 is disposed between the body portion 274 and the cylinder 262, the spring telescoping around the raised section 272 and having an end convolution 284 adapted to be secured to the flat body 274. The opposite end convolutions of the spring 282 telescope around the cylinder 262, and the end 286 thereof is secured thereto. The spring 282 thus serves to space the cylinder 262, and thus the plates 250 and 252, from the actuator body 274 and biases the plate actuator 270 downwardly against the housing bottom. In addition, the spring 282 serves to bias or cock the valve plates in a manner to be more specifically described hereinbelow. The bottom of the housing section 154 is provided with a raised or embossed portion 288 which functions to provide over center action for the plate actuating member 270, the body 274 of the latter being provided with upwardly curved sections at the side thereof to facilitate movement of the member 270 over the embossed portion 288.

Referring to FIG. 11, when fluid is supplied to the housing 150 when the valve assembly 254 is in a solid line position therein, such fluid will be directed through port 244 to chamber 178 and thence outwardly therefrom through the drive jets 172, whereby the spray arm 72 will rotate in a clockwise direction about the axis of the center post, all as indicated by arrows in FIG. 11. In such condition, the valve plate 252 is disposed approximately midway between the inclined surfaces 246 and 248. As the spray arm rotates, the arm 280 engages the stationary actuating pin 130 whereby the plate actuating member 270 will be pivoted clockwise about the pin 246 to its solid line, FIG. 11 position thereby cocking the spring 282. Due to the over center action provided by the raised section 288 of the housing, the actuator 270 will remain in such position until the spray arm is reversed in rotation as will be described hereinbelow. The pivotal movement of the plate actuator 270 will not at this time effect an unseating of the plate 250 from the engagement with the surface 246 due to the fluid pressure within the housing exceeding the force of the cocked spring 282.

When the fluid pressure within the housing 150 drops, for example at the end of a cycle as previously described, the force of the spring 282 will eventually exceed the fluid pressure acting against the valve plate 250 at which time the spring will force the plate 250 out of contact with the inclined surface 246. The spring 282 will simultaneously bias the valve plate 252 toward the inclined surface 248 and thus effect a closing of the port 244, such condition being shown in dashed lines in FIG. 11. The valve plate 250 will at this time assume a position substantially in alignment with the previously indicated position of the valve plate 252 approximately midway between the inclined surfaces 246 and 248. The plate actuating member 270 will of course remain in its solid line position until the direction of the spray arm 72 is reversed.

At the initiation of the next cycle, water introduced into the housing 150 will be directed through port 242 and thence through the drive jets 170 whereby the spray arm 72 will be driven in a counterclockwise direction, reference again being made of FIG. 11. As the spray arm rotates in a counterclockwise direction, the arm 278 will contact the stationary actuating pin 130 and the plate actuating member 270 will be pivoted about pin 264 to the dashed line position shown in FIG. 11. During each subsequent revolution of the spray arm, the arm 280 will contact the actuating pin thereby maintaining the plate actuating member in its dashed line, FIG. 11 position. As the plate actuating member 270 is moved to its dashed line position as a result of the arms 278 and 280 contacting the stationary actuating pin 130, the spring 282 will be cocked in a manner previously described whereby the valve plate 252 will be biased away from contact with the inclined surface 248. However, as long as the cycle continues, the fluid pressure within the housing acting against the valve plate 252 will exceed the pressure of the spring 282 whereby the valve plate 252 will be maintained in a position closing the port 244.

When the fluid pressure decreases within the housing at the end of the cycle, the force of the spring 282 will bias the valve plate 252 away from the port 244 thereby opening the same and pivoting the valve plates 250 and 252 back to their solid line, FIG. 11 position. In this manner the rotation of the spray arm is continually reversed in direction responsive to a decrease in fluid pressure.

Although the opposite end of the spray arm 72 has not been shown in FIGS. 11–15, it will be understood that such opposite end may be provided with non-drive jets of the type illustrated at 200 in the embodiment above described in reference to FIGS. 4–10, or, additional drive jets may be provided in such opposite end.

A third form of the present invention is illustrated in FIGS. 16–20, and this form of the invention similarly provides for reversal of the direction of rotation of the spray arm responsive to a decrease in pressure within the spray arm housing. This further form, however, differs from those previously illustrated in that drive jets are formed in both ends of the spray arm housing and there is accordingly provided fluid control means associated with both of said ends for controlling the fluid directed into the spray arm housing. The FIGS. 16–20 form further distinguishes those forms previously described in that a different arrangement is employed for cocking or torque loading the control mechanism for automatic reversal upon a drop in pressure within the spray arm housing.

The FIGS. 16–20 form comprises a spray arm housing 300 including upper and lower housing sections 302 and 304, respectively. The upper and lower sections are preferably secured together by mounting bolts as previously described. Drive jets collectively referenced at 308 are provided on both ends of the spray arm housing, the drive jets being directed upwardly and outwardly in the manner previously described. There are additionally provided radially and circumferentially spaced non-drive jets collectively designated at 310 in the central portion of the housing for providing additional spray to the washing chamber. It will be noted that the driving jets 308 are radially offset so as to provide varying spray patterns for each direction of rotation.

Vertically extending partitions 312 and 314 are formed in the ends of the housing 300, the partition 312 separating the associated housing end into two separate fluid chambers 316 and 318, and partition 314 forming similar chambers 320 and 322 in the opposite end of the housing.

The above-described fluid chambers 316–322 communicate with the central portion of the housing 300 through preferably rectangular openings commonly designated at 324 formed in generally V-shaped partitions generally indicated at 326 and 328. Similarly to the forms previously described, partitions 326 and 328 permit the fluid to enter the fluid chambers only through the openings 324, which are adapted to be alternately closed as will be hereinafter described.

Figure 19:
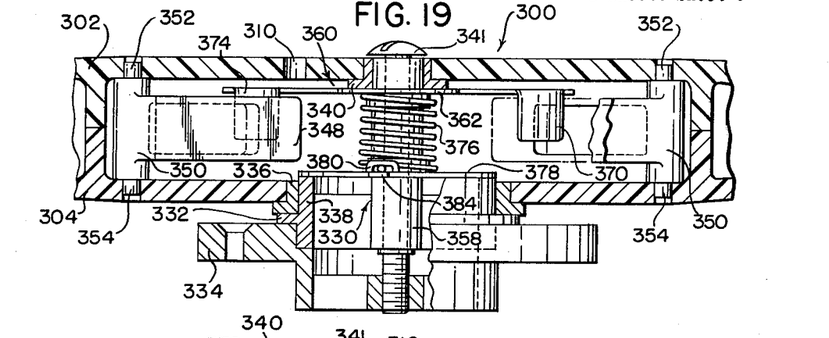
FIG. 19 is a longitudinal vertical sectional view taken on lines 19—19 of FIG. 16.
Figure 20:
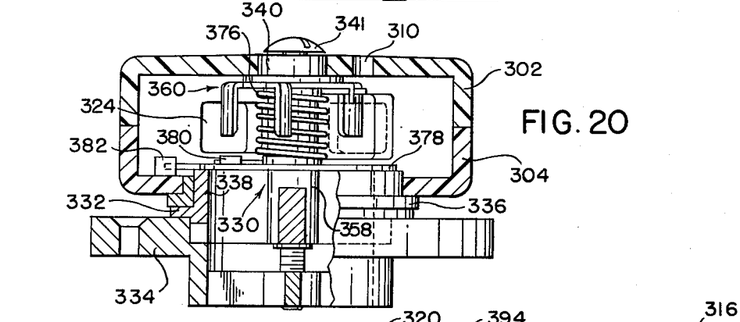
FIG. 20 is a transverse vertical sectional view taken on lines 20—20 of FIG. 16.

Referring to FIGS. 19 and 20, the spray arm housing 300 is adapted to be rotatably mounted on the center post and supporting structure therefor in generally the same manner as that previously described, and to the extent of such similarity, such structure will not be redescribed. The center post, generally designated at 330, structurally varies from that previously described in that an annular flange 332 is formed therewith which is adapted to seat on the center post mounting member 334. A preferably self-lubricating bearing 336 is press fit within the opening in the spray arm housing for rotatably mounting the spray arm on the center post. A similar bearing member 340 is provided for supporting the upper portion of the housing 300 about the center post. The spray arm housing is maintained on the center post structure by means of mounting bolt 341 which extends through the center post 330 into engagement with a threaded opening in mounting member 334 as previously described.

Figures 16, 17, 18:
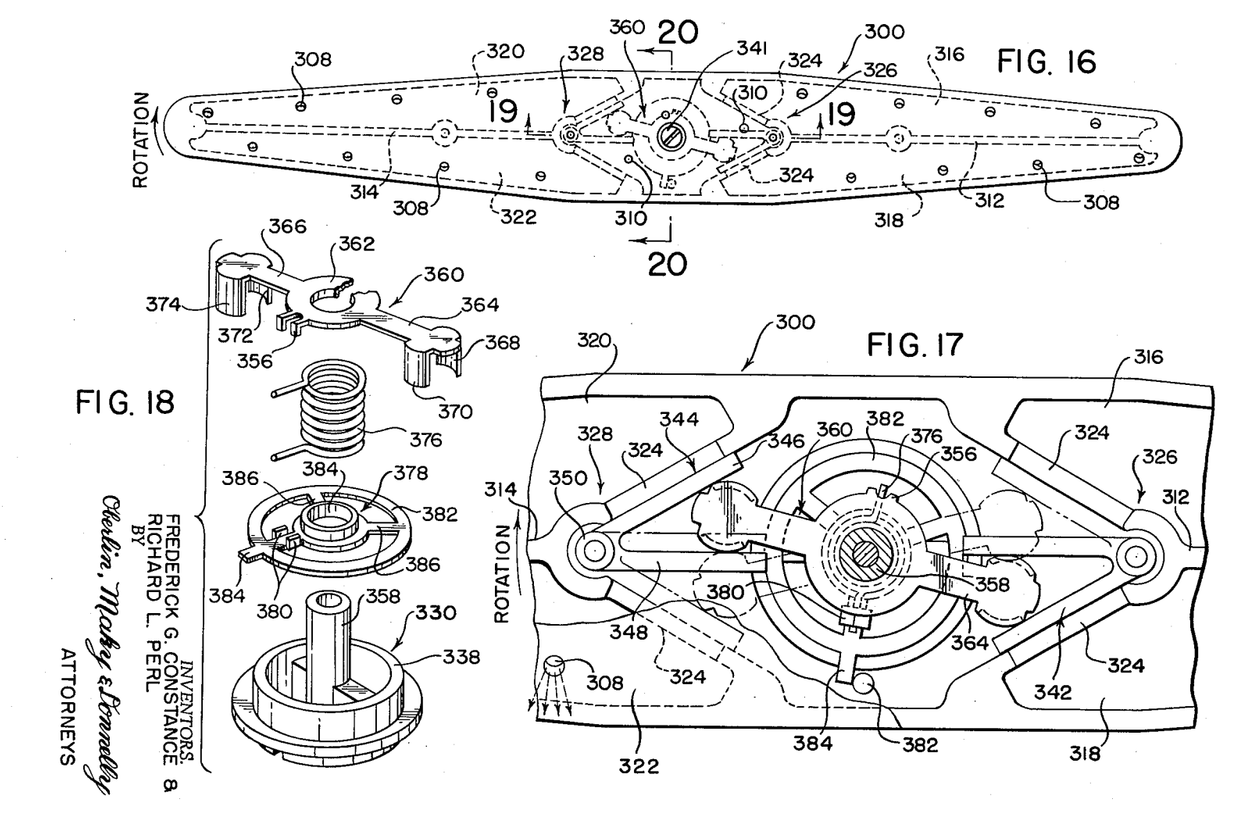
FIG. 16 is a top plan view of another alternative form of spray arm assembly.
FIG. 17 is an enlarged top plan view, partially broken away, of the fluid control mechanism of the alternative, FIG. 16 form of spray arm assembly.
FIG. 18 is an enlarged, exploded view of the fluid control mechanism of the FIG. 16 embodiment.

Referring now to the means for controlling the fluid flow into the chambers 316–322, a pair of V-shaped valves 342 and 344 are mounted adjacent the partitions 326 and 328 for alternately closing the openings 324. The valves 342 and 344 are identically constructed and valve 344, e.g., comprises spaced legs 346 and 348 which converge to a cylindrical valve body portion 350, the latter having mounted thereon at opposite ends mounting pins 352 and 354 which extend into openings provided therefor in the housing sections 302 and 304. The ends of the cylindrical body portion 350 are formed flat and smooth for sealing engagement with the opposed housing surfaces. Although not critical, the angle between the legs 346 and 348 is approximately one-half the angle between the sides of the partition 328, as seen in FIG. 17. The valve 344 is alternately positioned, as indicated by solid and dashed lines, over oppositely disposed openings 324 for alternating fluid flow to chambers 320 and 322, respectively.

A valve arm generally designated at 360 is rotatably mounted on the center post 330, the valve arm including a central mounting portion 362, oppositely directed arms 364 and 366 and downwardly turned flanges 368–374 at the outer ends of the arms. As best shown in FIG. 17, the flanges 368-374 contact the legs of the valves 342 and 344 whereby such valves can be pivoted to their alternate positions under conditions to be described below.

A clutch spring 376 is telescoped over the center post 330 and the upper convolution thereof has an end which extends through an opening in a downwardly depending flange 356 of the valve arm 360 whereby the clutch spring rotates with the valve arm. The end of the bottom convolution of the clutch spring 376 is mounted on a clutch plate generally indicated at 378, the latter being provided with upwardly extending tabs 380 which can be crimped over such lower spring end to hold the same in place. The radially outer peripheral ring 382 of the clutch plate 378 seats upon the cylindrical ring portion 338 of the center post as clearly shown in FIG. 20, and the plate further includes a hub portion 384 telescoped around the cylinder 358 of the center post. A plurality of spider connecting arms 386 serve to connect the peripheral ring 382 and the hub 384, such arms not materially affecting fluid flow upwardly through the center post. The clutch plate 378 is maintained in resilient engagement with the ring 338 by the clutch spring 376, the latter being compressed when operatively mounted, the spring also functioning to rotatably couple the clutch plate 378 to the valve arm 360 responsive to rotation of the latter, as will be presently described.

Referring now to the operation of the form shown in FIGS. 16-20, and presuming that the valve arm 360 is in its FIGS. 16 and 17 position at the initiation of the cycle, fluid introduced to the housing upwardly through the center post structure will enter the fluid chambers 316 and 322, the valves 342 and 344 closing the openings 324 to the chambers 318 and 320. The fluid emanating from the drive jets 308 communicating with the chambers 316 and 322 will effect rotation of the spray arm 300 in a clockwise rotation, as viewed and indicated in FIG. 16. During the initial stage of rotation, the upper convolutions of the clutch spring 376 will rotate relative to the lower convolutions thereof due to the compressive loading on the spring, thereby effecting a torque build-up in the spring. After a predetermined degree of rotation, the torque build-up in the spring 376 will exceed the compressive force of the spring whereby the clutch plate 378 will be carried with the clutch spring. To avoid excessive torque build-up in the spring 376 an upwardly extending stop member 382 is provided on the bottom housing section 304 which is adapted to engage a peripheral flange 384 formed on the ring 382 of the clutch plate to limit the rotation of the valve arm 360 relative to the clutch plate to less than one revolution of the spray arm. The torque build-up in the clutch spring 376 will never exceed in force the fluid pressure force acting on the valves 342 and 344 whereby such torque is unable during that cycle to effect rotation of the valves away from their FIG. 17, solid line position. However, upon a drop in pressure within the housing, such torque loading of the clutch spring will effect rotation of the valve arm 360 in the opposite direction about the axis of the center post. The legs 368-374 will, as a result of such movement, carry the valves 342 and 344 to a position adjacent the oppositely disposed openings 324 associated with the chambers 316 and 322.

As the fluid pressure builds up at the beginning of the next cycle, the fluid will be directed into the chambers 318 and 320; and, as described above, the clutch spring 376 will become torque loaded whereby the valve mechanism will automatically reverse the direction of rotation of the spray arm at the end of such next cycle.

Although there has been described only one such spray arm, it will of course be understood that a similar spray arm can be provided rotatably mounted in the upper portion of the washing chamber in a similar manner as the previously described spray arm 70.

Figure 21:
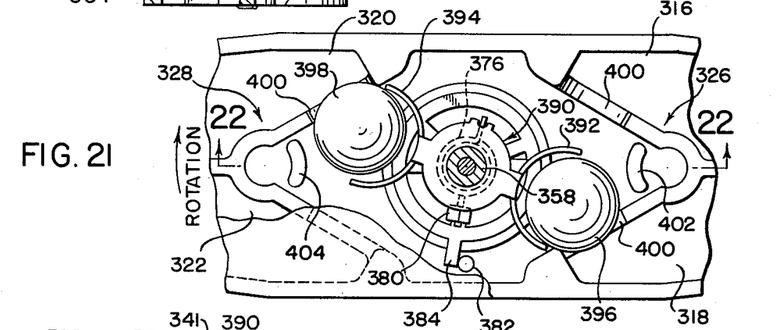
FIG. 21 is a fragmentary, plan view of another form of spray arm assembly, with the top of the housing partially removed to illustrate the fluid control mechanism.
Figure 22:
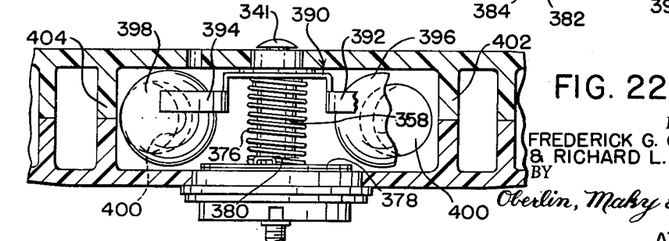
FIG. 22 is a longitudinal vertical sectional view of the FIG. 21 form of the invention, taken on lines 22—22 thereof.

A further modification is illustrated in FIGS. 21 and 22 for similarly automatically controlling drive jets disposed at both ends of the spray arm responsive to a drop in fluid pressure. Where the spray arm structure and center post and supporting structure therefor is identical with that preciously described in the form shown in FIGS. 16-20, the same reference numerals have been applied. In the FIGS. 21 and 22 form, the valve mechanism comprises a valve arm generally designated at 390 rotatably supported about the center post cylinder 358. The valve arm 390 has formed on each opposed end thereof guide members 392 and 394 which are adapted to embrace ball valves 396 and 398, respectively, and guide the movement thereof between opposed circular openings 400 in each partition 326 and 328. Curved vertical walls 402 and 404 are provided for preventing the ball valves 396 and 398, respectively, from moving away from the guide members 392 and 394, respectively. Although not illustrated, upwardly extending projections may be provided on the spray arm housing for preventing dead center positioning of the balls 396 and 398.

The means for controlling the pivotal movement of the valve arm 390 is identical with that previously described in the FIGS. 16-20 form, comprising clutch spring 376 and clutch plate 378. The operation of the form shown in FIGS. 21 and 22 is likewise similar to the operation of the FIGS. 16-20 form. Assuming the ball valves 396 and 398 to be in their FIG. 21 position, fluid entering the housing will be directed to the fluid chambers 316 and 322 whereby the spray arm will be rotated reactively in a clockwise direction. The clutch spring 376 will become torque loaded as above described subsequent to rotation of the spray arm and will effect a coupling or carrying of the clutch plate 378 therewith, as previously described. The torque loading of the clutch spring 376 in the direction opposite to rotation of the spray arm will not be effective to pivot the valve arm 390, however, due to the fluid pressure within the housing. When the fluid pressure within the housing drops at the end of the cycle, the torque loaded clutch spring 376 will, at a certain point, exceed the fluid pressure within the housing whereupon the valve arm 390 will pivot whereby the guide members 392 and 394 will carry the ball valves 396 and 398 to a position adjacent the oppositely disposed openings 324.

In regard to the form of the invention illustrated in FIGS. 21 and 22, it will be understood that a similarly constructed and operative spray arm can be provided in the region of the washing chamber whereat the previously described spray arm 70 is mounted.

It will be seen that in all forms of the invention the direction of rotation of the spray arm is automatically reversed during the cleaning operation, the number of such reversals depending on the selected operative cycle. Each reversal is derived from or is set up automatically by the rotation of the spray arm, such rotation in all of the disclosed forms serving to cock the valve actuating mechanism. By reversing the spray arm, the dishes and utensils in the washing chamber are thoroughly cleaned to an extent not heretofore possible with presently constructed directional spray arms. Such cleansing is further enhanced by the fact that the points of origin of the spray radially vary for each direction of rotation.

Other modes of applying the principle of the invention may be employed, change being made as regards the details described, provided the features stated in any of the following claims or the equivalent of such be employed.

We therefore particularly point out and distinctly claim as our invention:

1. A reversing spray arm assembly comprising a reaction type spray arm adapted to receive liquid under pressure, means for mounting said arm freely for rotation, said arm having orifices for discharging said liquid therefrom, means for supplying liquid under pressure to said spray arm, and means for reversing the direction of rotation of said spray arm in response to a drop in liquid pressure within said spray arm.

2. A reversing spray arm assembly comprising a reaction type spray arm adapted to receive liquid under pressure, means for mounting said spray arm freely for rotation, said spray arm having drive jet means for rotating said arm in both directions, means for supplying liquid under pressure to said spray arm, and valve means for reversing the direction of rotation of said spray arm in response to a drop in liquid pressure within said spray arm.

3. The combination of claim 2 wherein said spray arm is provided with at least two drive jets, the drive jets being inclined upwardly and outwardly respectively in opposite directions to provide for drive of said spray arm in both directions.

4. The combination of claim 2 wherein said spray arm is mounted adjacent the bottom of a washing chamber formed with a central raised portion having an opening communicating with hose means, pump means connected to said hose means, center post means associated with said hose means, and means for rotatably mounting said spray arm on said center post means.

5. The combination of claim 4 further including actuating means associated with said center post for actuating said valve means.

6. A dishwasher comprising a washing chamber, pump means having an inlet communicating with the bottom of said washer chamber, vertically spaced spray arms rotatably mounted in said washing chamber adjacent the bottom and relatively adjacent the top thereof, means for communicating the outlet of said pump means with each of said spray arms for supplying fluid under pressure to said spray arms for rotating the same, at least one of said spray arms having drive jets selectively for driving said one arm in both directions, and means in said one spray arm for reversing the direction of rotation of said spray arm responsive to a drop in fluid pressure within said arm.

7. A dishwasher comprising a washing chamber, pump means having an inlet communicating with the bottom of said washing chamber, a reaction type spray arm, means for rotatably mounting said spray arm in said chamber, the interior of said spray arm communicating with the outlet of said pump means whereby the latter supplies fluid under pressure to said spray arm for rotating the same, said spray arm being provided with a longitudinal partition in at least one end thereof, said partition separating said one end into two fluid chambers, one of said chambers communicating with a series of radially spaced drive jet openings in said spray arm directed upwardly and outwardly relative to said associated chamber, the other of said chambers communicating with a series of radially spaced, oppositely directed drive jet openings in said spray arm, whereby fluid supplied to said one chamber will effect rotation of said spray arm in one direction and fluid supplied to said other chamber will effect rotation of said spray arms in the opposite direction, and valve means alternately directing fluid in said spray arm to said chambers thereby reversing the direction of rotation of said spray arm, said valve means being operable in response to a drop in fluid pressure within said spray arm.

8. The combination of claim 7 further including a second partition within said spray arm, said second partition defining the radially inner limits of said chambers, said second partition having a pair of openings formed therein, each of said openings communicating respectively with each of said chambers, said valve means alternately closing each of said openings responsive to a drop of pressure within said spray arm, whereby fluid directed to said spray arm is alternately directed to said chambers for alternately reversing the direction of rotation of said spray arm.

9. The combination of claim 8 wherein said valve means comprises a ball member alternately seatable in said openings in said second partition by the fluid pressure within said spray arm, said ball being supported for movement between said openings by a bar pivotally mounted within said arm adjacent said second partition, a bar actuator pivotally mounted on the bottom of said spray arm and engaging the bottom of said bar, said bar actuator being biased upwardly during rotation of said spray arm by a stationary pin actuating means secured to the means for mounting said spray arm, said bar tending to unseat said ball from the associated opening, the force of said bar on said ball being ineffective to unseat said ball when the pressure of the fluid supplied to said spray arm exceeds a predetermined amount, said bar effecting such unseating when the fluid pressure drops below such predetermined amount, the ball when unseated rolling by gravity down said bar into position adjacent the other opening in said second partition.

10. The combination of claim 8 wherein said valve means comprises a pair of angularly disposed valve plates pivotally mounted in said spray arm, each of said plates being seatable on said second partition for covering the associated opening therein, resilient means biasing said valve plate away from such seating position during rotation of said spray arm, such biasing effect being ineffective to unseat said valve plate due to the fluid pressure acting to seat said valve plate, stationary actuating pin means mounted on said mounting means for said spray arm for biasing said resilient means during rotation of said spray arm, said resilient means being effective responsive to a drop of pressure within said spray arm to pivot said valve plate away from seated engagement with said second partition and to move the other of said valve plates adjacent the other opening in said second partition.

11. A dishwasher comprising a washing chamber, pump means having an inlet communicating with the bottom of said washing chamber, a reaction type spray arm, means for rotatably mounting said spray arm in the bottom of said chamber, said spray arm being provided with oppositely directed drive jet openings in each end thereof to accommodate rotation of said spray arm in both directions, said spray arm communicating with the outlet of said pump means whereby the latter supplies liquid under pressure to said drive jets for reactively rotating said arm, and valve means in said spray arm for controlling liqiud flow within said spray arm for effecting reversal of the direction of rotation thereof responsive to a drop in the liquid pressure within said spray arm.

12. The combination of claim 11 wherein each end of said spray arm is provided with a longitudinal and generally transverse partition which define first and second liquid chambers, a row of radially spaced drive jet openings communicating with said first liquid chamber for rotating said spray arm in one direction, and a row of radially spaced, oppositely directed drive jet openings communicating with said second liquid chamber, said transverse partition being formed with openings to said first and second liquid chambers, said valve means alternately closing said openings whereby liquid supplied to said spray arm is directed alternately to said first and second liquid chambers.

13. The combination of claim 12 wherein said valve means is operatively connected to biasing means for biasing said valve means during rotation of said spray arm away from a first position closing the respective opening to a second position adjacent the respective openings in the other liquid chambers, such biasing being ineffective to actuate said valve means when the liquid pressure within said spray arm exceeds a predetermined amount, the dropping of liquid pressure within said arm below said predetermined amount effecting movement of said valve means by said biasing means to said second position whereby subsequent supply of liquid under a pressure in excess of said predetermined amount effects rotation of said spray arm in the opposite direction.

14. The combination of claim 13 wherein said biasing means comprises a coil spring operatively connected at one end to said valve means and at its other end to a clutch plate seated on said mounting means for said spray arm, said coil spring biasing said clutch plate into such seated position, initial rotation of said spray arm effecting rotation of said valve means and the upper end of said coil spring relative to the lower end thereof thereby effecting a torque buildup therein, such torque upon further rotation of said spray arm overcoming the force of said spring and effecting rotation of said clutch plate relative to said mounting means, such torque buildup biasing said valve means away from said first position but being ineffective in so doing until the fluid pressure within said spray arm drops below said predetermined amount.

15. The combination of claim 14 further including stop means mounted on said spray arm for limiting the relative rotation between said spray arm and said valve means, and said clutch plate thereby limiting the torque buildup in said coil spring.

16. The combination of claim 14 wherein said valve means comprises a pair of V-shaped valve members pivotally mounted in said spray arm, each valve member being mounted respectively adjacent the generally transverse partitions, the legs of said valve members alternately closing the openings to said first and second liquid chambers, and valve arm means mounted in said spray arm and disposed in operative engagement with both of said valve members for simultaneously moving said valve members upon a drop in liquid pressure within said spray arm.

17. The combination of claim 14 wherein said valve means comprises a valve arm rotatably supported within said spray arm and ball valve members carried at the opposite ends of said valve arm, each of said ball valves alternately closing said openings to said first and second liquid chambers, said valve arm being operatively connected to said coil spring, whereby said valve arm carries said ball valves to a position adjacent the other of said openings responsive to a drop of liquid pressure within said spray arm.

18. The combination of claim 17 wherein said valve arm is provided at opposite ends thereof with guide members which embrace the ball valves and guide the movement thereof between the openings in said generally transverse partition, and means for maintaining said ball valves within said guide means.

19. A dishwasher comprising a washing chamber, a reaction type spray arm rotatably mounted in said washing chamber, pump means for supplying liquid under pressure to said spray arm for rotating the same, said spray arm having four liquid chambers for selectively receiving liquid from said pump, each of said liquid chambers communicating with the washing chamber through a plurality of drive jet openings formed in the spray arm, valve means in said spray arm for alternately directing liquid to a first pair of said liquid chambers for rotating said spray arm in one direction, and to a second pair of said liquid chambers for rotating said spray arm in the opposite direction.

20. A reversing spray arm assembly comprising a reaction type spray arm adapted to receive liquid under pressure, means for mounting said spray arm freely for rotation, drive jet means for rotating the arm as a result of discharge of pressure liquid therethrough, said drive jet means having two conditions of adjustment respectively for thus rotating the arm in both directions, actuator mechanism for causing the drive jet means to be adjusted from the condition producing rotation in one direction to the position causing the arm to rotate in the opposite direction, said actuating means being subjected to the influence of the pressure liquid and restrained thereby from actuating the drive jet means when the pressure is above a pre-determined value, and means responsive to rotation of the arm in one direction for biasing the actuating means to adjust the drive jet means for rotation of the arm in the reverse direction, whereby a drop in the pressure of the liquid below said pre-determined value results in automatic adjustment of the drive jet means by the actuating mechanism to the position for such reverse direction.

21. A reversing spray arm assembly comprising a rotatably mounted reaction spray arm, means for supplying liquid under pressure to said spray arm, said spray arm being provided with first drive jet means for rotating said spray arm in one direction and second drive jet means for driving said spray arm in the opposite direction, first chamber means communicating with said first drive jet means for supplying liquid under pressure thereto and second chamber means communicating with said second drive jet means for supplying liquid under pressure thereto, valving mechanism responsive to fluctuations in liquid pressure within said spray arm for reversing the direction of rotation thereof, said valving mechanism comprising a valve arm disposed within said spray arm and at least one valve member adapted to be moved by said valve arm for alternately directing the liquid to said first and second chamber means for respectively rotating said spray arm first in said one direction and then in said other direction.

22. A reversing spray arm assembly comprising a rotatably mounted reaction spray arm, means for supplying liquid under pressure to said spray arm, partition means within said spray arm defining first and second chamber means for alternately receiving the liquid under pressure, said spray arm being provided with first drive jet means communicating with said first chamber means for rotating said spray arm in one direction and second drive jet means communicating with said second chamber means for rotating said spray arm in the opposite direction, valving mechanism responsive to fluctuation in the liquid pressure within said spray arm for reversing the direction of rotation thereof, said valving mechanism comprising a valve arm rotatably mounted in said spray arm and valve members adapted to be moved by said valve arm for alternately directing liquid to said first and second chamber means for respectively rotating said spray arm first in said one direction and then in said opposite direction.

References Cited by the Examiner

UNITED STATES PATENTS

| 1,733,249 | 10/29 | Clinton | 134—179 X |
| 2,012,178 | 8/35 | Anderson | 239—66 |
| 2,426,291 | 8/47 | Abrams | 134—179 X |
| 2,893,416 | 7/59 | Hegstad | 137—119 |
| 2,918,927 | 12/59 | Clearman | 134—176 X |
| 3,064,665 | 11/62 | Martiniak | 134—176 |

FOREIGN PATENTS 257,268    7/12    Germany.

CHARLES A. WILLMUTH, *Primary Examiner.*